E. W. PHELPS.
Bee Hive.

No. 8,859.

Patented April 6, 1852.

UNITED STATES PATENT OFFICE.

E. W. PHELPS, OF NEWARK, OHIO.

MOTH-TRAP TO BEEHIVES.

Specification of Letters Patent No. 8,859, dated April 6, 1852.

*To all whom it may concern:*

Be it known that I, EBENEZER W. PHELPS, of Newark, in the county of Licking and State of Ohio, have invented a new and useful Improvement in Beehives, of which the following is a full, clear, and exact description, reference being had to the accompanying drawing, forming part of this specification, in which—

Figure 1:
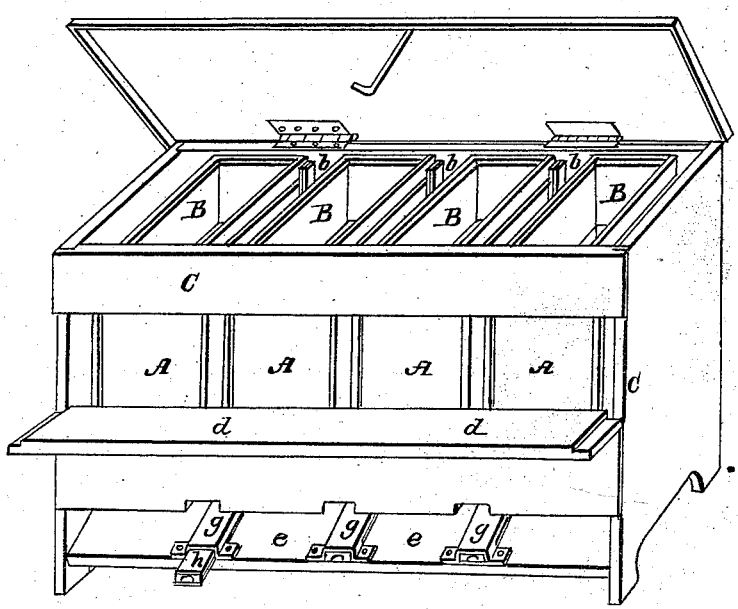
Figure 2:
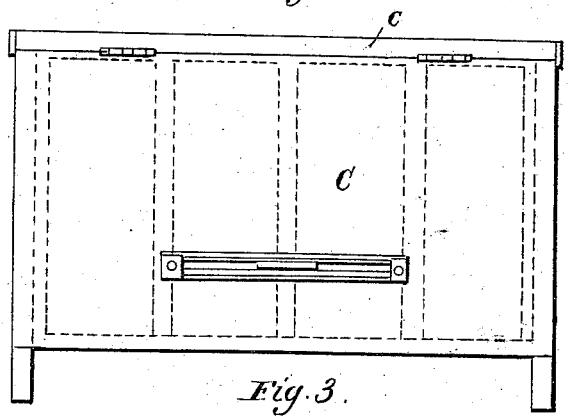
Figure 3:
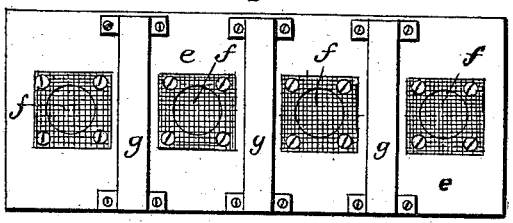
Figure 4:
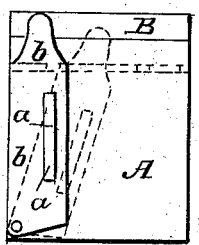
Figure 5:
Figure 6:
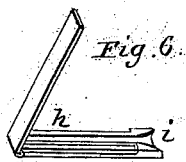

Figure 1 represents a perspective view of the back of one of my improved hives with the top raised, the back shutter lowered, and the bottom depressed to show the arrangement of the interior; Fig. 2 is a front elevation of the same; Fig. 3 is a plan of the bottom; Fig. 4 is a side view and Fig. 5 an end view of one of the sectional hives; and Fig. 6 is a perspective view of one of my moth traps turned upside down and the bottom raised to show the interior grooves.

The nature of my invention consists in applying to the floors of hives shallow removable grooved cases or moth traps, communicating with the interior of the hive by openings large enough to admit the grub of the bee moth, but too small to allow the entrance of bees. The end of the trap is flush with the outside of the hive, and has an opening to admit the bee moth which seeks to enter the hive for the purpose of depositing its eggs.

Grubs thrown out of the comb by the bees, enter the grooves of the trap to escape from them; and moths finding the end of the trap not guarded by the bees, enter there to deposit their eggs; and by withdrawing the trap, moths, eggs, and grubs can all be effectually removed and destroyed, and thus all danger averted.

I prefer to make my hives of several sections placed next to each other within a case. Each section consists of a rectangular box (A) open at its bottom and having a hole in its front for the entrance and exit of the bees. To the top of this box a smaller hive or case (B) is applied which communicates with the lower portion by holes through which the bees can pass; the back of the sectional box and the top or the smaller case are made of glass. Each side of the sectional box is pierced with a slot (*a*) so as to communicate with the adjoining sections, and to each side a slide (*b*) is hinged by its lower extremity. The slide has a slot equal in size with that in the side of the section, and when in an upright position the two slots correspond with each other, but by moving the slide its solid part closes the communication between the sections of the hive.

All of the sectional boxes are made exactly like each other, so that when placed side by side, the openings in their sides shall exactly correspond.

A sectional hive has the advantage of allowing the separation of the bees without the inconvenience of swarming; it also enables one to remove those sections which contain old comb, and to substitute new sections in place of them.

The sections are placed side by side in an exterior case (C) which may be made large enough to admit any required number. The top (*c*) is hinged to the case and there is also a hinged shutter (*d*) at the back to enable one to examine the state of the hives, and to clean the case. The bottom (*e*) is also hinged to the case; it has ventilating openings (*f*) covered with wire cloth, corresponding with the several sections, and shallow cases *g*, *g*, in which the moth trap is inserted. The cases are placed immediately beneath the edges of two adjoining sections, thus preventing the bees, as well as moths and roaches or other intruders from entering the space between them. The cases are attached to the bottom (*e*) at each extremity, and their sides between the points of attachment, are at a sufficient distance from the bottom to allow the moths and grubs to enter the moth trap, but small enough to prevent the entrance of bees.

The moth trap (*h*) has a central groove extending longitudinally in its lower side, in which moths enter at the end (*i*) extending through the back of the case. There are also longitudinal grooves corresponding with the openings in the sides of the cases *g*. A strip of tin plate, corresponding in length and breadth with the case, is hinged to one extremity of the trap; this forms a bottom for the grooves, and prevents the moths or grubs from escaping therefrom while the trap is withdrawn.

The depredations of the bee moth are the most destructive which the bee keeper has to encounter, but as the natural history of this insect is well understood and its depredations have been well studied and described I deem it unnecessary herein to describe its method of entering a hive and its mode of action while there more fully than to state that when a moth enters a hive it seeks instinctively the shelter of crevices such as those afforded by the trap to lay its eggs, and that such grubs as are hatched in the comb are ejected therefrom by the bees before they become old enough to spin also seek protection and shelter in the crevices of the trap, so that by frequently withdrawing the latter and destroying the moths, grubs, and eggs found therein all danger to the hive may be averted.

I claim—

The peculiar construction of the moth-trap as herein described, composed of a slide having the center groove and two side grooves, and the metallic hinged cover arranged all as set forth in the specification.

EBENEZER W. PHELPS.

Witnesses:
 SAMUEL H. BANCROFT,
 J. C. SPRINGER.